N. L. HELDMAN.
WHEAT SEPARATING MACHINE.
APPLICATION FILED SEPT. 17, 1910.
987,460.
Patented Mar. 21, 1911.
2 SHEETS—SHEET 2.
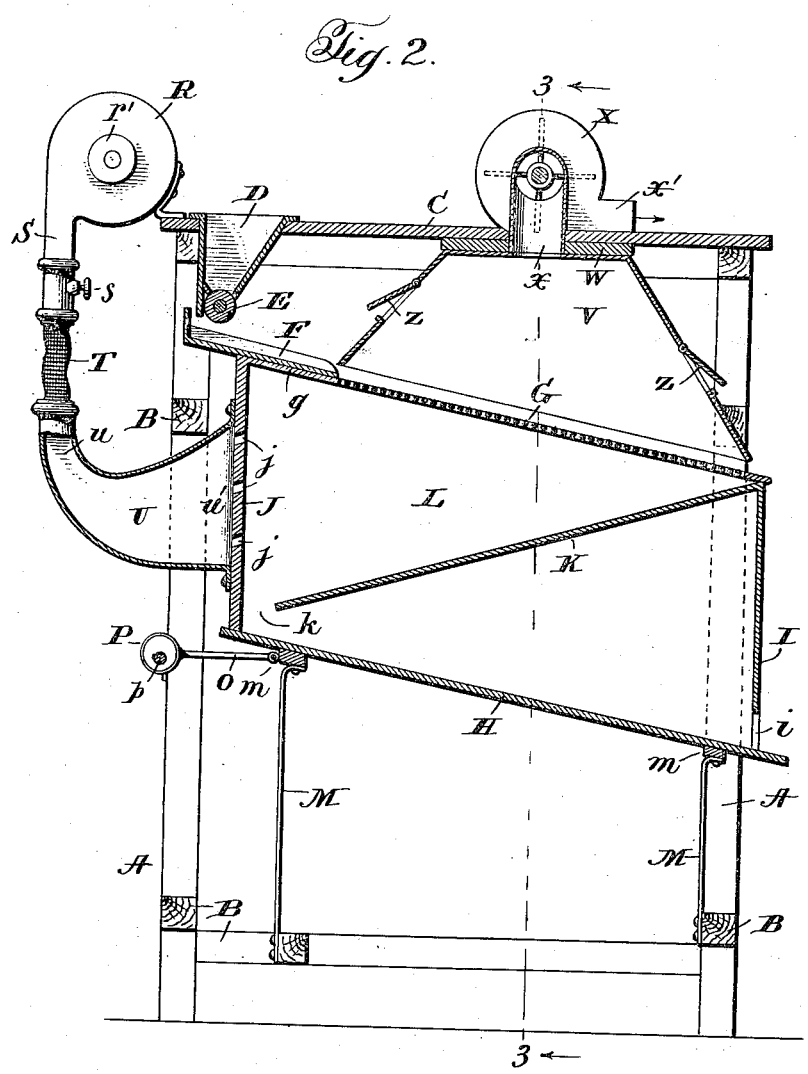

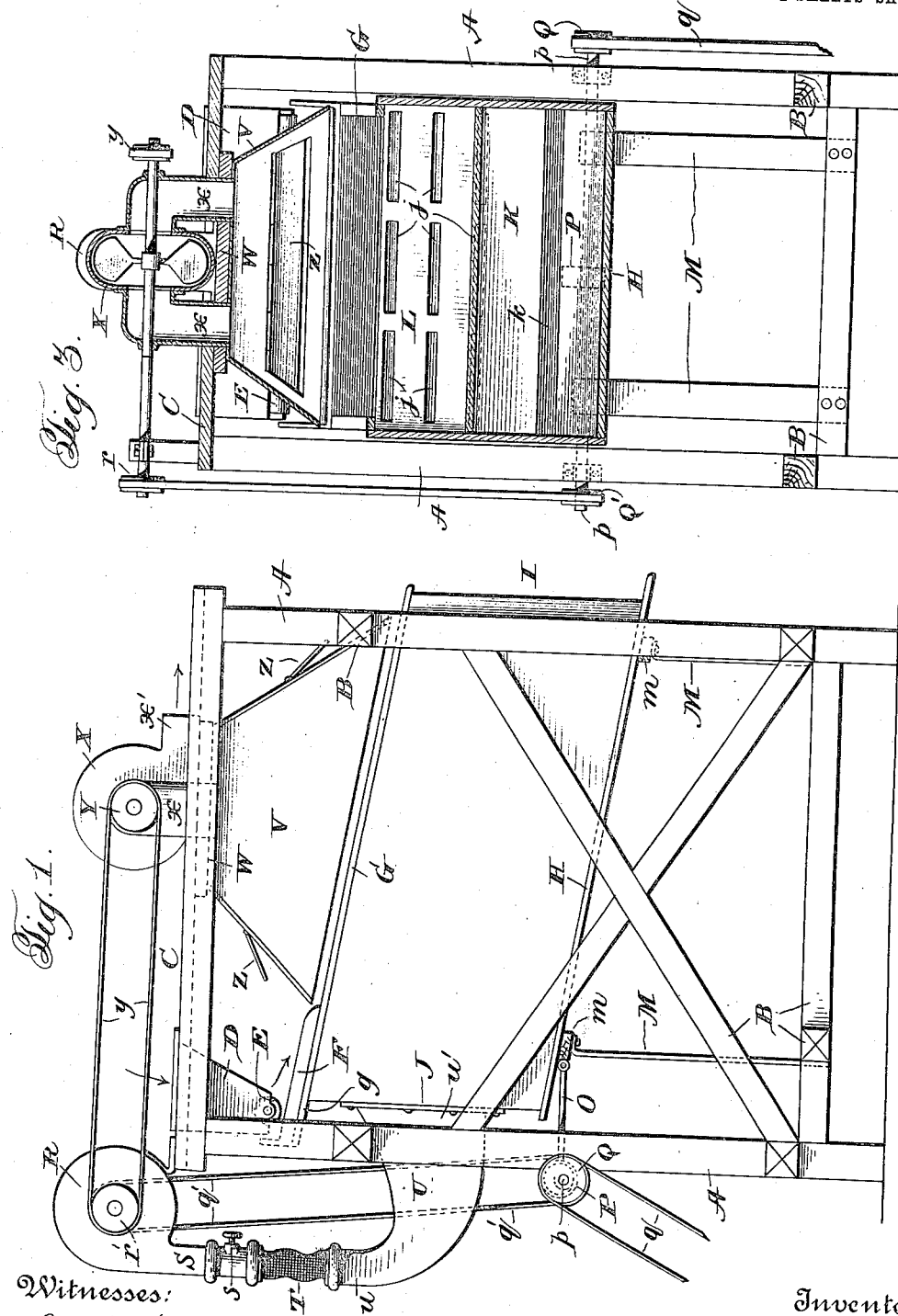

UNITED STATES PATENT OFFICE.

NICHOLAS L. HELDMAN, OF CARMI, ILLINOIS.

WHEAT-SEPARATING MACHINE.

987,460. Specification of Letters Patent. Patented Mar. 21, 1911.

Application filed September 17, 1910. Serial No. 582,583.

*To all whom it may concern:*

Be it known that I, NICHOLAS L. HELDMAN, a citizen of the United States, residing at Carmi, in the county of White and State of Illinois, have invented certain new and useful Improvements in Wheat-Separating Machines, of which the following is a specification, reference being had therein to the accompanying drawing.

This invention relates to improvements in separators and has for its primary object the provision of a machine of this character especially adapted for the cleaning of wheat by the separation therefrom of wild onions and garlic.

The invention comprises a combined blast chamber and sieve bodily movable with reference to the remaining portions of the machine to shake and blow the material being treated, in combination with a blast, and preferably with a suction device covering the top of said combined blast chamber and sieve.

Many improved details in the construction and arrangement of parts of an apparatus made in keeping with my invention will be apparent from the specific description hereinafter contained when read in connection with the accompanying drawings forming part hereof and wherein a convenient embodiment of the invention is illustrated.

In the drawings: Figure 1 is a side elevation of the apparatus, Fig. 2 is a vertical sectional view of the same, and Fig. 3 is a section on the line 3—3 of Fig. 2.

Referring more specifically to the drawings, wherein like reference characters designate corresponding parts in the several views, A represents vertical standards and B suitable cross bars connecting therewith to constitute a rigid framework. At the upper forward end of the framework and supported from the top C of the machine I provide a feed hopper D, the same being provided with any suitable controlling means at its discharge end, as a gate or roller E feeding to a trough F. The trough is inclined downwardly toward the rear of the machine and discharges onto a correspondingly inclined foraminated support or screen G constituting the top of a combined sieve and blast device. The bottom of this device is represented at H, the rear wall thereof at 1, and the front of the same at J, the bottom extending in an inclined direction parallel to the sieve G, the end wall I terminating short of the bottom D to provide a discharge opening $i$ for the wheat, and the front wall J being provided with apertured portions $j$ arranged in lines projecting upwardly toward the sieve G. An apron K extending from the top of the rear wall I in a diagonal direction therefrom to near the forward lower corner of the device conducts the material downwardly and forwardly and subjects the same to the blast of air within the blast chamber L until it discharges over the open end $k$ of the apron onto the bottom H.

The trough F above referred to is secured to and carried by the top portion $g$ of the combined blast chamber and sieve.

M, are spring standards secured to the cross bars B of the framework at their lower ends and at their upper ends connected as at $m$ to the bottom H of the combined blast chamber and sieve. These springs normally maintain the device supported thereby in a central position, as indicated in Fig. 2 and are capable of vibrating to constitute a yieldable support to facilitate the shifting of the material and separation thereof under the operation of an eccentrically actuated pitman O operated through the medium of an eccentric shaft $p$, and an eccentric P. A driving pulley Q at one end of the shaft coupled with any source of power through the instrumentality of a drive belt $q$ affords the operating medium to accomplish the shaking just described and for also driving the blast and suction fans now to be defined, a pulley Q' at the opposite end of the shaft $p$ and belt connection $q'$ leading to a pulley $r$ connecting the same with the blast fan R.

The blast fan R is a blower of any convenient or preferred construction provided with the usual casing having a tangential discharge spout S provided with a controlling valve $s$, said spout being connected through the medium of a flexible pipe section T with the inlet end $u$ of a blast trumpet U, the wide discharge mouth $u'$ of which is connected to the wall J of the combined sieve and blast chamber, so that said mouth entirely surrounds the upwardly directed apertures $j$ in said wall.

An upwardly tapering hood V secured at its top to a supporting plate W fastened to the upper portion of the frame work of the machine, constitutes a suction chamber, the same depending to a plane near the upper surface of the screen G and substantially covering the same, though disconnected therewith, so that the draft in said chamber may be exerted through the screen G while permitting the latter to be vibrated back and forth beneath the hood.

X is a suction fan also mounted upon the supporting plate W provided with two inlets $x$ opening to the suction chamber and an outlet $x'$, a pulley Y on the shaft of the fan connecting the same with a pulley $r'$ of the blower R through the medium of a belt $y$ connecting said pulleys together. To control the suction within the hood V as created by the suction fan X, suitable adjustable valves Z open to the exterior of the hood, are formed in the end walls of the latter.

From the foregoing description, the operation of the machine will probably be readily understood, but the same may be here outlined.

The main operating belt $q$ being connected with the source of power and the eccentric pitman and suction and exhaust fans being simultaneously actuated, it will be appreciated that the combined sieve and blast chamber will be shaken back and forth under the influence of the eccentric and the spring supports while the material is being fed in a sheet formation downwardly through the feed hopper and trough onto the screen. The shaking of the combined sieve and blast chamber while maintaining the proper association of the same with the blower, is enabled through the medium of the intermediate flexible pipe connection. The blast and suction coöperate to separate the material being treated to free the wheat from the objectionable substances, particularly wild onions and garlic, it being observed that the blast chamber tapers toward its rear or far end relative to the blast trumpet, so that the material is uniformly subjected to the blast and suction, said blast being thus enabled to exert its greater operating force, where the blast chamber is deepest and to a correspondingly less extent as the chamber decreases in depth.

The advantages of suction chamber in connection with the blast from blower, is that the blast from blower tends to blow the onions or garlic above the screen G, while the suction fan draws them up through the suction chamber and fan inlets into and through the fan itself, after which they are discharged into a collector or anywhere desired, so what would pass over end of screen G would be in the nature of very large onions or garlic, or some other foreign substances too heavy to be drawn off by the amount of suction governing the work.

A special advantage of my machine over those now in use, is in the facility with which it separates those onions whose sizes are the same as the grains of wheat. This is due to the fact that the specific gravity of the onions is somewhat less than that of the wheat, thereby allowing the same to be drawn through the fan, but at the same time leaving the wheat which, as before stated, has a greater specific gravity than the onions. This is controlled by means of the adjustable valves Z. In those onions whose specific gravity is the same as the grains of wheat (which is quite rare) the outer rough surface of the onion will allow itself to be drawn upwardly by the air into and through the fan and leave the grains of wheat on account of their smoothness.

While I have herein disclosed one specific embodiment of my invention, it is to be understood that the invention is capable of being embodied in other forms and devices, as will appear to those skilled in the art.

Having thus described my invention, what I claim as new and desire to secure by Letters Patent is:

1. In a machine of the character described, a separating chamber having a screened top wall and one of its end walls perforated, a blast trumpet connected to said end wall and surrounding said perforations, and a blower communicating with said blast trumpet, means for shaking the separating chamber, and a hood mounted above the screen of the separating chamber and provided with a suction device.

2. In a machine of the character described, a separator comprising a bodily movable chamber provided with a vertical front wall and downwardly and rearwardly inclined top and bottom walls, said top wall being formed of reticulated material, a blast device adapted to deliver air through the front wall of the receptacle, an inclined apron positioned within the receptacle in advance of the front wall thereof, and a suction device arranged above the chamber and provided with a hood substantially covering the reticulated top wall thereof.

3. In a machine of the character described, a screen separating chamber having one of its end walls perforated, a blast trumpet connected to said end wall and surrounding said perforations, a blower communicating with said blast trumpet, in combination with means for shaking the separating chamber, said separating chamber inclining downwardly from front to rear and having a screen constituting the top thereof, an apron within the separator below the screen extending from the upper portion of the rear wall of the separator downwardly to near the lower portion of the front wall to constitute a discharge at said front wall and the rear wall terminating near the bottom of the device to constitute a discharge thereat, and a hood mounted above the screen of the separating chamber and provided with a suction device.

4. In a machine of the character described, a separating chamber comprising a screened top and a bottom, said chamber having a discharge opening at its rear end adjacent the bottom thereof, a vertical front wall connecting the top and bottom of said chamber, a blast device adapted to deliver air through the front wall of the chamber, and an inclined apron in the separating chamber, the upper end of said apron terminating adjacent the rear end of the chamber and the screened top thereof and the lower end thereof terminating short of the bottom of the chamber and adjacent the front thereof.

5. In a machine of the character described, a separating chamber having a screened top wall and one of its end walls perforated, a blast trumpet connected to said end wall and surrounding said perforations, and a blower communicating with said blast trumpet, in combination with means for shaking the separating chamber.

6. In a machine of the character described, a screened separating chamber having one of its end walls perforated, a blast trumpet connected to said end wall and surrounding said perforations, a blower communicating with said blast trumpet, in combination with means for shaking the separator, the separator inclining downwardly from front to rear and having a screen constituting the top thereof, and the perforations in the front wall inclining toward said top.

7. In a machine of the character described, a screened separating chamber having one of its end walls perforated, a blast trumpet connected to said end wall and surrounding said perforations, a blower communicating with said blast trumpet, in combination with means for shaking the separator, the separator inclining downwardly from front to rear and having a screen constituting the top thereof, the perforations in the front wall inclining toward said top, and an apron within the separator below the screen extending from the upper portion of the rear wall thereof downwardly to near the lower portion of the front wall to constitute a discharge at said front wall.

8. In a machine of the character described, a screened separating chamber having one of its end walls perforated, a blast trumpet connected to said end wall and surrounding said perforations, a blower communicating with said blast trumpet, in combination with means for shaking the separator, the separator inclining downwardly from front to rear and having a screen constituting the top thereof, the perforations in the front wall inclining toward said top, an apron within the separator below the screen extending from the upper portion of the rear wall thereof downwardly to near the lower portion of the front wall to constitute a discharge at said front wall, and the rear wall terminating near the bottom of the device to constitute a discharge thereat.

9. In a machine of the character described, a screened separating chamber inclining downwardly from front to rear and provided with a screened top and with a bottom, a perforated end wall connecting the front ends of the top and bottom of the separating chamber, a blast trumpet connected to said end wall and surrounding said perforations, a blower communicating with said blast trumpet, and an apron within the separator below the screen extending from the upper portion of the rear wall of the separator downwardly to near the lower portion of the front wall to constitute a discharge at said front wall.

10. In a machine of the character described, a separating chamber comprising a downwardly inclined screened top, a downwardly inclined bottom, a perforated front wall connecting the screen top and bottom, a rear wall extending downwardly from the screened top and terminating short of the bottom, an inclined apron in the separating chamber, the upper end of said apron terminating adjacent the rear end of the chamber and the screened top thereof and the lower end thereof terminating short of the bottom of the chamber and adjacent the front wall thereof, a blast trumpet connected to the front wall of the chamber and a blower communicating with said blast trumpet.

11. In a machine of the character described, a separating chamber provided with an inclined screened top, means for shaking the separating chamber, a blast device communicating with one end of the chamber and arranged near the higher end of the screen and adapted to blow against the same from therebeneath and approximately longitudinally thereof, a suction device arranged above the screen provided with a hood substantially covering the same and constituting a suction chamber, in combination with an inclined shelf in the screened chamber below the screen arranged with its lower end extending downwardly relative to the blast device and terminating short of the bottom of the separating chamber.

12. In a machine of the character described, a separator comprising a bodily movable receptacle provided with a vertical front wall and downwardly and rearwardly inclining top and bottom walls, the top wall comprising a screen, and a blast device connected to the front wall, said front wall being provided with perforations inclining upwardly toward the screen, substantially as and for the purpose described.

13. In a machine of the character described, a separator comprising a bodily movable receptacle provided with a vertical front wall and downwardly and rearwardly inclining top and bottom walls, the top wall comprising a screen, a blast device connected to the front wall, said front wall being provided with perforations inclining upwardly toward the screen, and an apron within the separator inclining downwardly from the upper rear portion thereof, substantially as and for the purpose described.

14. In a machine of the character described, a separator comprising a bodily movable receptacle provided with a vertical front wall and downwardly and rearwardly inclining top and bottom walls, the top wall comprising a screen, a blast device connected to the front wall, said front wall being provided with perforations inclining upwardly toward the screen, in combination with a suction device provided with a hood, substantially covering the screen, and means for causing the material to be fed over said screen, substantially as and for the purpose described.

15. In a machine of the character described, a separator comprising a bodily movable receptacle provided with a vertical front wall and downwardly and rearwardly inclining top and bottom walls, the top wall comprising a screen, a blast device connected to the front wall, said front wall being provided with perforations inclining upwardly toward the screen, and an apron within the separator inclining downwardly from the upper rear portion thereof, in combination with a suction device provided with a hood substantially covering the screen, and means for causing the material to be fed over said screen, substantially as and for the purpose described.

In testimony whereof I affix my signature in presence of two witnesses.

NICHOLAS L. HELDMAN.

Witnesses:
R. R. BENSON,
GEO. A. CALKIN.